2,970,974
HOT MELT ADHESIVES CONTAINING POLYVINYL METHYL ETHER

Charles P. Albus, Easton, Pa., and Julian L. Azorlosa, Westbury, N.Y., assignors to General Aniline & Film Corporation, New York, N.Y., a corporation of Delaware No Drawing. Filed Dec. 24, 1956, Ser. No. 630,048

7 Claims. (Cl. 260—27)

This invention relates to new and useful compositions of matter and specifically to coating and adhesive compositions of matter, which may be employed as "hot melts."

Coating and adhesive compositions generally may be classified into two major categories, those which are termed "hot melts" and those which are based upon the use of a solvent in the formulation. The hot melt adhesives are quite extensively used because they are considerably cheaper than the solvent base formulations, they give quick tack while in the molten state, they harden very quickly upon cooling, they have no residual solvent odor or taste, and their application is generally a simple one step-operating procedure. Solvent compositions, on the other hand, are usually employed where it is not possible for the particular purpose or problem at hand to find an adequate hot melt composition. By using a solvent it is possible to overcome the deficiencies of undue hardness and high melting point which might be a characteristic of a particular formulation desired as the final coating and/or adhesive composition. Hot melt compositions by virtue of their property of being meltable are properly classified as thermoplastic materials. Most thermoplastic natural and synthetic resins heretofore employed in hot melts are hard, brittle substances. At least the more inexpensive ones are in this category, such as wood rosin, gum rosin, coumarone-indene resins, chlorinated paraffins, chlorinated biphenyls, etc. Some thermoplastics are quite flexible but, on the other hand, quite expensive, such as ethyl cellulose, polyvinyl acetate, and the like. It is, furthermore, a common complaint among users of hot melts that they are usually too brittle at cold temperatures and tend to crack, chip, etc., and often too soft at warm temperatures, causing failure of the adhesive bond.

It is therefore an object of this invention to provide new and usful compositions which are characterized by outstanding adhesive properties and which are not subject to the deficiencies of over-brittleness at cold temperatures or overtackiness at warm temperatures.

It is a further object of this invention to provide new and useful compositions which may be employed as hot melt adhesive compositions and which give outstanding, flexible and resistant adhesive bonds between many surfaces.

It is another object of this invention to provide new and useful compositions which may be employed as hot melt coating compositions and which give outstanding tough and flexible coatings on many surfaces.

It is still another object of this invention to provide new and useful compositions of matter comprising polyvinyl methyl ether and a rosin or rosin derivative modifier therewith which compositions exhibit outstanding properties as coating compositions for many surfaces.

It is a still further object of this invention to provide new and useful compositions of matter comprising polyvinyl methyl ether and a modifier therewith which compositions exhibit outstanding properties as hot melt adhesives.

The compositions of this invention comprise, on the one hand, a polyvinyl methyl ether in combination with a modifying agent selected from the class of the naturally occurring gum and wood rosins and their synthetic derivatives. The modifying agents contemplated in the present invention are solid compounds having a softening point above about 75° C. Included within this category of materials are the following substances with their approximate softening points (by the ring and ball method)

| | ° C. |
|---|---|
| Wood rosin | 80 |
| Gum rosin | 83 |
| Rosin esters derived from either gum or wood rosin such as: | |
|    Glycerol esters (ester gums) | 90 |
|    Pentaerythritol esters | 115 |
| Hydrogenated rosin | 75 |
| Polymerized rosin | 100 |
| Disproportionated rosin | 80 |
| Polyhydric alcohol derivatives of hydrogenated rosin, e.g.; | |
|    Glycerol derivatives | 85 |
| Polyhydro alcohol derivatives of polymerized rosin, e.g.: | |
|    Ethylene glycol ester | 82 |
|    Glycerol ester | 110 |
| Oxidized rosins | 105 |

Hydrogenated oxidized rosin esters of oxidized rosin and the like.

Any of the common commercial grades of wood or gum rosin may be employed ranging from the "X" and water white grades to the darkest grades (e.g., D–grade), the impurities in the latter giving rise to the color body formation being insignificant in their effect upon the usefulness of the compositions of this invention.

The polyvinyl methyl ethers which may be employed are water-soluble polymers which are liquids or semi-solids at room temperatures, and are characterized by having a specific viscosity within the range of about 0.3 to 1.5. The specific viscosity is determined from a 1 g. sample of the polymer in 100 ml. of benzene at 25° C. The K values of these polymers range from about 20 to 75 and the corresponding molecular weights from about 2000 to 10,000.

The compositions which are useful as hot melt adhesives comprise the polyvinyl methyl ether and from ⅓ to 7 times the amount thereof of the rosin modifying agent described above. Thus, based upon the combined weight of the rosin modifying agent and the polymer, one may use from 12.5% to 75% by weight of polyvinyl methyl ether. In spite of the relatively large amount of the polyvinyl methyl ether in the hot melt adhesive composition, it is completely unexpected that such compositions would be resistant to water even though the polyvinyl methyl ether is completely soluble in this medium. Thus, for example, a composition containing 1 part of wood rosin and 3 parts polyvinyl methyl ether (K value=40) when subjected to shaking in water for 72 hours and subsequent drying for 48 hours at 125° C. showed a weight loss of only 1.8% whereas wood rosin itself under the same treatment gave a loss of 3.1%. By virtue, therefore, of this unexpected property resulting from the combination of the polyvinyl methyl ether with the aforementioned modifying agent it is possible to provide hot melt adhesive compositions which give excellent adhesive bonds quickly and which bonds are not subject to deterioration when exposed to conditions of high humidity or water immersion or the like. The following examples will serve to illustrate the invention without being deemed limitative thereof. Unless otherwise indicated, parts means grams.

Example 1

87.5 parts of N-wood rosin and 12.5 parts polyvinyl methyl ether (K value=30) are mixed together and heated to about 300° F. until a compatible solution results. The melt may then be employed for attaching paper labels to metallic cans using rollers.

Example 2

The procedure of Example 1 is repeated except that 80 parts of rosin are employed with 20 parts of the polyvinyl methyl ether. Similar results are obtained.

Example 3

50 parts of vinsol resin (softening point 103° C.) (this is a gasoline insoluble pine wood resin obtained in the steam distillation of pine wood stumps and contains essentially oxidized rosins) and 50 parts of polyvinyl methyl ether are melted together as in Example 1. This composition is then applied by a brush to kraft paper and laminated to kraft paper, burlap and aluminum foil. In each instance excellent bonding occurs.

Example 4

A composition comprising 60 parts of hydrogenated wood rosin and 40 parts polyvinyl methyl ether (K value=60) is prepared as a hot melt as described in Example 1. This composition is employed for laminating cellophane, cellulose acetate, and cellulose acetate butyrate to paper. Tenaceous, flexible, and quick bonding results in each case.

Example 5

The procedure of Example 4 is repeated except that hydrogenated gum rosin is substituted for the wood rosin in that example. Similar results are obtained.

Example 6

A composition comprising 75 parts of WW gum rosin and 25 parts polyvinyl methyl ether (K value=30) is heated to 325° F. until a homogeneous solution is obtained. This composition gives excellent bonding to a cellulose acetate film, glass, and galvanized iron.

Example 7

Three separate compositions comprising: (a) 65 parts N-wood rosin and 35 parts polyvinyl methyl ether (K=30); (b) 50 parts N-wood rosin and 50 parts polyvinyl methyl ether (K=30); and (c) 30 parts N-wood rosin and 70 parts polyvinyl methyl ether (K=30) are prepared by heating to 300° C. and each is applied to black iron, enameled black iron, and galvanized iron. Excellent adhesion to the surfaces results at room temperature and at temperatures of 125° F. Composition (c) is considerably more tacky than compositions (a) and (b), and is therefore better suited for use as an adhesive between such surfaces as described in this example, and other similar surfaces or dissimilar surfaces such as paper, glass, or cellulose acetate film.

Example 8

Three compositions, a, b and c, are prepared as described in Example 7 except that an oxidized rosin having a softening point of 105° C. is employed in lieu of the wood rosin of Example 7. Each of these three compositions is then applied to black iron, enameled black iron, and galvanized iron. Satisfactory adhesion to these surfaces results. Compositions b and c are particularly outstanding and further, composition c is better suited as an adhesive rather than a coating composition in the manner of composition c of Example 7 because of the slight tack exhibited by this composition.

Example 9

The composition described in Example 1 is employed to coat iron, galvanized iron and enameled iron sheets. The resultant coatings are extremely tough and are admirably suited as temporary protective coatings of such metallic articles.

Example 10

Example 4 is repeated except that the polyvinyl methyl ether is one having the K value of 39. Similar excellent results are obtained.

Example 11

Example 3 is repeated employing the following composition: 60 parts oxidized rosin, softening point 106° C., 40 parts polyvinyl methyl ether having a K value of 20. Excellent laminates of the materials described in Example 3 are obtained.

Example 12

55 parts of X gum rosin and 45 parts of polyvinyl methyl ether (K=75) are combined by heating until a homogeneous fluid composition results. This composition is an excellent adhesive for laminating heavy kraft paper to paper and metallic foils and is also admirably suited for use as book-binding adhesive.

Example 13

A composition comprising 60 parts of ester gum having a softening point of 92° C. and an acid number of 6 is combined with 40 parts of polyvinyl methyl ether (K=50) employing heat until a homogeneous solution results. This composition is useful similarly as that described in Example 12.

Example 14

70 parts of a hydrogenated ester gum having a softening point of 85° C. and an acid number of 5 is combined with 30 parts of polyvinyl methyl ether (K=71) until a homogeneous solution at 320° F. is obtained. This composition forms excellent tough and tenacious coatings on iron, galvanized iron, enameled iron, glass and tin plate. This composition may also be used for laminating such materials to each other and also to heavy kraft paper.

Example 15

50 parts of a pentaerythritol ester of rosin having a softening point of 110° C. and an acid number of 15 is combined into a homogeneous solution (at 325° F.) with 50 parts of polyvinyl methyl ether having a K value of 25. The resultant composition is an excellent temporary protective coating for various metallic articles.

Example 16

65 parts of an ethylene glycol ester of a polymerized rosin, softening point 80° C., acid number 10, is combined with 35 parts of polyvinyl methyl ether having a K value of 60. This composition in the fluid state (temperature of 320° F.) is suitable for laminating kraft type papers to metallic surfaces.

To demonstrate the water-insensitivity of the compositions of this invention the following tests were conducted. 10 g. of a blend of a polyvinyl methyl ether (K value=40) and the rosin or rosin derivatives is placed in 4 oz. bottles to which 1400 g. of distilled water has been added. The bottles are capped and placed on a laboratory shaker for 72 hours at room temperature. The water is filtered off and the residue dried for 48 hours at 120° C. The weight losses are recorded after 6, 24 and 48 hours at this temperature. In the following table the results are given employing an oxidized rosin with varying amounts of polyvinyl methyl ether and a wood rosin with varying amounts of polyvinyl methyl ether.

TABLE I

*Water sensitivity of blends*

| Composition | Percent Weight Loss After Heating at 125° C. for— | | |
|---|---|---|---|
| | 6 hr. | 24 hr. | 48 hr. |
| Oxidized rosin | 1.0 | 1.4 | 1.8 |
| Oxidized rosin + 12.5% PVM [1] | 0.6 | 0.8 | 1.1 |
| Oxidized rosin + 25% PVM | 0.5 | 0.9 | 1.2 |
| Oxidized rosin + 50% PVM | 0.2 | 0.7 | 1.0 |
| Oxidized rosin + 75% PVM | 1.0 | 1.6 | 1.8 |
| N wood rosin | 1.5 | 2.3 | 3.1 |
| Rosin + 12.5% PVM | 1.5 | 0.7 | 1.0 |
| Rosin + 25% PVM | 0.5 | 1.5 | 2.0 |
| Rosin + 50% PVM | 1.0 | 2.0 | 2.4 |
| Rosin + 75% PVM | 1.0 | 1.4 | 1.8 |

[1] Polyvinyl methyl ether.

It will be observed from an inspection of the data in the above table that in almost all cases the loss of the blends containing from 12.5 to 75% polyvinyl methyl ether is less than the loss incurred by the straight rosin or rosin derivative. With rosin this is true in all instances. It is indeed quite remarkable that a composition containing as much as 75% water-soluble polyvinyl methyl ether and 25% rosin exhibits less weight loss after 72 hours of water extraction than straight rosin itself under the same conditions.

We claim:

1. A hot melt adhesive compatible composition consisting essentially of from 12.5 to 75% by weight polyvinyl methyl ether having a molecular weight of from about 2000 to 10,000 and from 25 to 87.5% of a modifying agent selected from the group consisting of rosin and ester derivatives thereof, said modifying agent having a melting point above about 75° C.

2. A hot melt adhesive compatible composition consisting essentially of from 15 to 50% by weight of a water-soluble polyvinyl methyl ether having a molecular weight of from about 2000 to 10,000 and from 50 to 85% by weight of a modifying agent selected from the group consisting of rosin and ester derivatives thereof, said modifying agent having a melting point of above about 75° C.

3. A compatible adhesive composition suitable for use as a hot melt consisting essentially of from 15 to 50% by weight of a water-soluble polyvinyl methyl ether having a molecular weight of from about 2000 to 10,000 and from 50 to 85% by weight of rosin.

4. A compatible adhesive composition suitable for use as a hot melt consisting essentially of from 15 to 50% by weight of a water-soluble polyvinyl methyl ether having a molecular weight of from about 2000 to 10,000 and from 50 to 85% by weight of oxidized rosin.

5. A compatible adhesive composition suitable for use as a hot melt consisting essentially of from 15 to 50% by weight of water-soluble polyvinyl methyl ether having a molecular weight of from about 2000 to 10,000 and from 50 to 85% by weight of hydrogenated rosin.

6. A compatible adhesive composition suitable for use as a hot melt consisting essentially of from 15 to 50% by weight of a water-soluble polyvinyl methyl ether having a molecular weight of from about 2000 to 10,000 and from 50 to 85% by weight of hydrogenated vinsol.

7. A compatible adhesive composition suitable for use as a hot melt consisting essentially of from 15 to 50% by weight of a water-soluble polyvinyl methyl ether having a molecular weight of from about 2000 to 10,000 and from 50 to 85% by weight of an ester gum having a melting point above about 75° C.

References Cited in the file of this patent

UNITED STATES PATENTS

| | | |
|---|---|---|
| 2,104,002 | Reppe et al. | Dec. 28, 1937 |
| 2,300,587 | Menger | Nov. 3, 1942 |
| 2,580,488 | Vogl et al. | Jan. 1, 1952 |
| 2,697,084 | Eger | Dec. 14, 1954 |

OTHER REFERENCES

Delmonte: The Technology of Adhesives, Reinhold Publ. (1947), pages 136–137.

UNITED STATES PATENT OFFICE
CERTIFICATION OF CORRECTION

Patent No. 2,970,974                          February 7, 1961

Charles P. Albus et al.

It is hereby certified that error appears in the above numbered patent requiring correction and that the said Letters Patent should read as corrected below.

Column 5, line 34, after "87.5%" insert --- by weight ---.

Signed and sealed this 5th day of September 1961.

(SEAL)
Attest:

ERNEST W. SWIDER                        DAVID L. LADD

Attesting Officer                          Commissioner of Patents